Feb. 12, 1929.                                                           1,701,569
L. S. KEILHOLTZ ET AL
ELECTRICAL APPARATUS
Filed Jan. 14, 1924

Inventor
Lester S. Keilholtz and
Eugene J. Barbey
By Spencer Duvall and Hardman
His Attorneys Patented Feb. 12, 1929.

1,701,569

UNITED STATES PATENT OFFICE.

LESTER S. KEILHOLTZ AND EUGENE J. BARNEY, OF DAYTON, OHIO, ASSIGNORS TO DELCO-LIGHT COMPANY, OF DAYTON, OHIO, A CORPORATION OF DELAWARE.

ELECTRICAL APPARATUS.

Application filed January 14, 1924. Serial No. 685,991.

This invention relates to battery charging apparatus and the principal object of the invention is to indicate the extent to which the battery should be charged in order that the battery potential will be substantially the same for varying environment temperature. The apparatus aims also to indicate to what extent a battery may preferably be discharged for different environment temperatures.

In order to accomplish these objects, one form of the invention provides a hydrometer which floats in one of the cells of the storage battery and cooperates with a member carrying scales which indicate predetermined limits of battery charging and discharging which are preferable for different environment temperatures. One scale indicates when the battery can be considered fully charged for that particular temperature, and another when the battery should be recharged for that temperature.

Further objects and advantages of the present invention will be apparent from the following description, reference being had to the accompanying drawing wherein a preferred embodiment of one form of the present invention is clearly shown.

Figure 1:
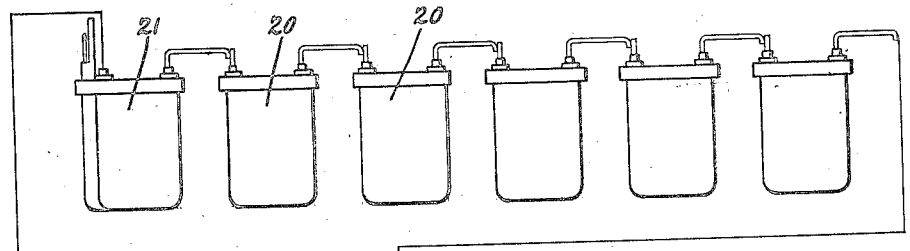
Fig. 1 is a diagram of a battery charging system including a generator and a plurality of storage battery cells.
Figure 3:
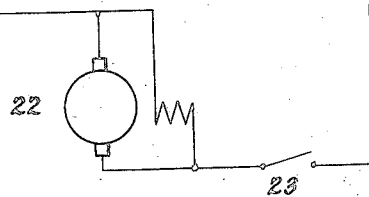
Fig. 3 is a sectional view taken substantially on the line 3—3 of Fig. 2.
Figure 3:
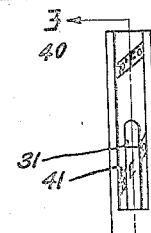
Figure 3:
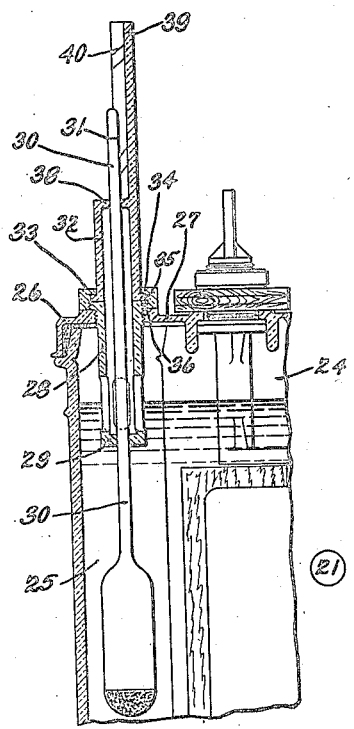

Referring to the drawings the battery charging system includes a battery having a plurality of cells 20 and a specially constructed cell 21. These cells are connected together in series with a generator 22 and the battery charging circuit is completed by switch 23. The non-conducting battery jar 24 which provides the cell 21 includes a hydrometer chamber 25 which is covered by an extension 26 of the battery cell cover 27. The cover 26 is provided with a threaded aperture which receives a sleeve 28 providing at 29 a bearing for a hydrometer 30 which carries at its upper end an index 31. A scale member 32 is attached to the sleeve 28 by means of a nut 33 having an inwardly extending flange 34 engaging an outwardly extending flange 35 on the lower end of the scale member 32. The nut 33 engages screw threads on a flange 36 at the upper end of the sleeve 28. The scale member 32 provides a bearing 38 adjacent the upper end of the hydrometer 30. The scale member 32 is provided with a semi-cylindrical extension 39.

Figure 2:
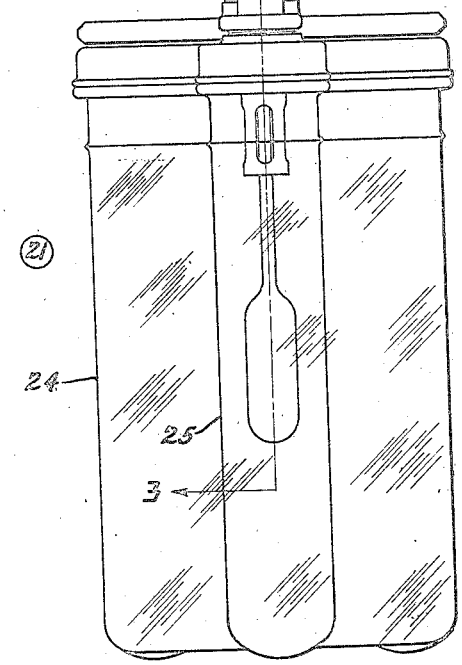
Fig. 2 is an end elevation of one of the cells showing the present invention applied thereto.

The bearings 29 and 38 provide guides for the upper and lower portions of the stem of the hydrometer to prevent the stem from engaging the plates of the battery or the extension 39. In this manner the hydrometer is free to move vertically. Extension 39 carries at its upper end a scale 40 which is inclined to the horizontal and bears the indicia 70° at the lower end of the scale and 0° at the upper end. This scale may bear the letter "F" to indicate full. Below the scale 40 the part 39 supports a scale 41 which also is inclined to the horizontal but to a greater extent than the scale 40. This scale 41 bears a number 70 vertically below the 70 on scale 40 and a zero mark vertically below the zero mark on scale 40. The scale 41 may bear the letter "E" to indicate empty. Assuming that the environment temperature is at zero degrees the position of the hydrometer as shown in Fig. 2 indicates an empty battery. If the temperature is still at zero degrees after the battery has been charged, then the state of full charge such as necessary to give the battery the desired potential will be arrived at when the pointer 31 is opposite the zero mark on the scale 40. If the temperture is 70° surrounding the battery, then the battery will be fully charged to give the desired potential when the pointer is opposite 70 on scale 40. The battery may be discharged at this temperature until the pointer 31 is opposite 70 on scale 41. Between 0° and 70°, for example 35° a state of full battery charge will be indicated when the pointer 41 is midway between 0° and 70° on scale 40 and an empty battery will be indicated when the pointer 41 is midway between 0° and 70° on scale 41. Obviously, readings for other temperatures can be arrived at by properly dividing the distances between zero and 70 degrees marked on the upper and lower scales.

It is to be understood that the invention is not limited to the particular marks illustrated, but that other temperature marks may be established and the scales arranged accordingly.

The advantages of the present invention will be apparent when it is considered that it is necessary to charge a battery to a greater extent in cold weather than in warmer because the battery resistance is higher in colder weather. Therefore, the internal E. M. F. of the battery must be greater to overcome this resistance so that the potential across the terminals of all the battery cells will be at the desired value required for all conditions of temperature. Hence, the scale 40 has been arranged so that the greatest battery specific gravity must be registered in order that a "full" state of battery charge will be indicated in cold weather.

The advantage of the lower scale will be apparent when it is considered that a battery should not be discharged to the same extent in cold weather as in warm weather on account of the liability of freezing. Therefore, the scale 41 has been calibrated and arranged to indicate a higher hydrometer reading when empty in cold weather than in warm weather. This feature has another advantage in that it tends to warn the operator that the battery should be charged in order that the battery potential may be maintained at a point where the battery current will be available when needed, as, for example, for cranking an engine in cold weather. It is well understood that engine cranking is more difficult in cold weather than in warm weather on account of the increased resistance offered by cold engine lubricant, and because the battery resistance is higher in cold weather. Therefore, if the battery is to be used for engine cranking, it is desirable that a state of charge of the battery to be maintained on the average at a higher value than should safely be maintained in warm weather.

The present invention accomplishes these results by the inclined scales 40 and 41 which require operating the battery over a range of specific gravity variations having higher limit values in warmer weather than in colder weather.

While the form of embodiment of the invention as herein disclosed, constitutes a preferred form, it is to be understood that other forms might be adopted, all coming within the scope of the claims which follow.

What is claimed is as follows:

1. A battery charge indicator, comprising, in combination, a hydrometer adapted to float in the battery electrolyte and provided with an index in fixed relation with respect to said hydrometer, and a temperature scale supported by the battery cell and cooperating with said fixed index for indicating the condition of battery charge according to environment temperature.

2. A battery charge indicator comprising, in combination, a hydrometer adapted to float in the battery electrolyte and provided with an index in fixed relation with respect to said hydrometer and a temperature scale supported by the battery cell and cooperating with the fixed index for indicating predetermined limits of battery charging and discharging for different environment temperatures.

3. In combination, a battery cell and cover therefor, a battery charge indicator comprising, a hydrometer adapted to float in the battery electrolyte and provided with an index, a removable member suspended from the cover for providing a lower guide bearing for the hydrometer, a removable member extending above the cover and providing an upper guide bearing for the hydrometer in alignment with the lower bearing, and common means for securing said members in position.

4. In combination, a battery cell and cover therefor, a battery charge indicator comprising a hydrometer adapted to float in the battery electrolyte and provided with an index, and means detachably secured to the battery cell cover and providing a plurality of guide bearings for the hydrometer, one being below the normal level of the electrolyte, said means having a scale cooperating with said hydrometer index.

5. In combination, a battery cell and cover therefor, a battery charge indicator comprising a hydrometer adapted to float in the battery electrolyte and provided with an index, a member suspended from the battery cell cover for providing a hydrometer guide bearing below the cover, and a member detachably secured to the cell cover for providing a hydrometer guide bearing above the cover and provided with a scale cooperating with said hydrometer index.

6. A battery charge indicator comprising, in combination, a hydrometer adapted to float in the battery electrolyte and provided with an index in fixed relation with respect to the hydrometer, and a member provided with temperature scales for indicating different ranges of specific gravity values which are preferred for battery operation for different environment temperatures.

7. A hydrometer adapted to indicate the condition of charge of a battery, comprising in combination, a device having a plurality of scales deviating from the horizontal and temperature indicia for said scales, a float having index means co-operating with said device, said device with said scales and said float with said index means being adapted when co-operating to indicate the condition of charge of said battery for the environment temperature.

8. A battery charge indicator comprising in combination a hydrometer adapted to float in the battery electrolyte and provided with an index in fixed relation with respect to said hydrometer, a member having indicia adapted to be traversed by said index, said device with said indicia indicating a condition of charge existing between ranges of temperature indicated thereon, said indicia or said device being substantially horizontal but deviating from the horizontal sufficiently to permit said index to be read at a point coinciding to the prevailing condition of charge and environment temperature during the vertical movement of said hydrometer in said electrolyte.

9. A battery charge indicator comprising in combination a hydrometer adapted to float in the battery electrolyte and provided with an index in fixed relation with respect to said hydrometer, a device having a plurality of substantially horizontal scales located one above the other and adapted to indicate conditions of charge of the electrolyte, each of said scales being compensated for environment temperature.

10. A battery charge indicator comprising in combination a hydrometer adapted to float in the battery electrolyte and provided with an index in fixed relation with respect to said hydrometer, a device having a plurality of scales adapted to be traversed by said index, one of said scales being adapted to indicate a certain state of charge and another of said scales adapted to indicate a different state of charge, each of said scales being arranged with respect to the index to compensate for environment temperature.

11. In a hydrometer adapted to indicate the condition of a battery electrolyte, in combination an index carried by said hydrometer, a device having a plurality of superposed scales adapted to be traversed by said index, each scale indicating a range of temperature, said scales being substantially horizontal but deviating from the horizontal sufficiently to permit the index to indicate the condition of charge at a given point of said temperature indicia during the vertical movement of said hydrometer in said electrolyte.

12. An indicator adapted to indicate the condition of charge of a battery, comprising in combination, a hydrometer adapted to float in a battery electrolyte and having indicating means, a relatively stationary member having indicating means arranged to be traversed by the hydrometer indicating means, said means being arranged at an oblique angle to one another.

13. An indicator adapted to indicate the condition of charge of a battery, comprising in combination, a hydrometer adapted to float in a battery electrolyte and having indicating means, a relatively stationary member having indicating means arranged to be traversed by the hydrometer indicating means, the indicating means on said stationary member being arranged at an oblique angle to the direction of movement of the hydrometer indicating means.

In testimony whereof we hereto affix our signatures.

LESTER S. KEILHOLTZ.
EUGENE J. BARNEY.